United States Patent
Peeters et al.

(10) Patent No.: US 7,388,925 B2
(45) Date of Patent: Jun. 17, 2008

(54) CARRIER CONSTELLATION INFORMATION IN MULTI-CARRIER SYSTEMS

(75) Inventors: Miguel Peeters, Brussels (BE); Dimitri Marcel Saey, Lokeren (BE); Philippe Antoine, Walhain (BE)

(73) Assignee: Alcatel, Paris (FR)

( * ) Notice: Subject to any disclaimer, the term of this patent is extended or adjusted under 35 U.S.C. 154(b) by 918 days.

(21) Appl. No.: 09/767,850

(22) Filed: Jan. 24, 2001

(65) Prior Publication Data
US 2001/0012783 A1    Aug. 9, 2001

(30) Foreign Application Priority Data
Jan. 28, 2000    (EP) .................................. 00400231

(51) Int. Cl.
*H04L 5/12*    (2006.01)
*H04L 23/02*   (2006.01)

(52) U.S. Cl. ...................... 375/265; 375/220; 375/222; 375/260; 375/341

(58) Field of Classification Search ................ 375/149, 375/220, 222, 265, 341, 261, 346, 260, 267, 375/229, 206, 275, 232, 219, 295; 370/206, 370/210, 207, 441, 286, 208, 503; 455/91, 455/69, 500; 714/792, 758
See application file for complete search history.

(56) References Cited

U.S. PATENT DOCUMENTS 5,914,958 A * 6/1999 Chinitz et al. .............. 370/441
6,073,151 A * 6/2000 Baker et al. ................ 708/290
6,215,793 B1 * 4/2001 Gultekin et al. ............ 370/465

(Continued)

FOREIGN PATENT DOCUMENTS

WO    WO 99/33215 A    7/1999

(Continued)

OTHER PUBLICATIONS

ANSI TI.413-1998.

(Continued)

*Primary Examiner*—Ted Wang
(74) *Attorney, Agent, or Firm*—Sughrue Mion, PLLC

(57) ABSTRACT

In a multi-carrier system, the carriers ($f_0 \ldots f_{511}$, $f_{512} \ldots f_{1023}, \ldots, f_{3584} \ldots f_{4095}$) are grouped in subsets (SUBSET1; SUBSET2; . . . ; SUBSET8). A constellation information transmitting arrangement (BiGi_TA), for instance located in the multi-carrier receiver (RX), produces for each carrier subset (SUBSET1; SUBSET2; . . . ; SUBSET8) a limited set of parameter values (B1, G1; B2, G2; . . . ; B8, G8) and transmits these sets of parameter values (B1, G1; B2, G2; . . . ; B8, G8) to a constellation information receiving arrangement (BiGi_RA), for instance located in the multi-carrier transmitter (TX). Through interpolation of the limited set of parameter values (B1, G1; B2, G2; . . . ; B8, G8) the latter constellation information receiving arrangement (BiGi_RA) determines the constellation where each carrier ($f_0 \ldots f_{511}$, $f_{512} \ldots f_{1023}, \ldots, f_{3584} \ldots f_{4095}$) of a carrier subset (SUBSET1; SUBSET2; . . . ; SUBSET8) will be modulated with.

14 Claims, 1 Drawing Sheet

U.S. PATENT DOCUMENTS

| | | | |
|---|---|---|---|
| 6,226,322 B1 * | 5/2001 | Mukherjee | 375/229 |
| 6,351,473 B1 * | 2/2002 | Reusens et al. | 370/480 |
| 6,366,554 B1 * | 4/2002 | Isaksson et al. | 370/206 |
| 6,445,731 B1 * | 9/2002 | Yamano et al. | 375/222 |
| 6,549,512 B2 * | 4/2003 | Wu et al. | 370/210 |
| 6,560,445 B1 * | 5/2003 | Fette et al. | 455/90 |
| 6,614,834 B1 * | 9/2003 | Meng et al. | 375/149 |

OTHER PUBLICATIONS

Chow: "Superframe-based bit allocation algorithms for DMT systems" IEEE Global Telecommunications Conference, Nov. 8-12, 1998, pp. 2800-2805, XP000801554, New York, US.

Sonalkar, Shively: "An efficient bit-loading algorithm for DMT applications" IEEE Global Telecommunications Conference, Nov. 8-12, 1998, pp. 2683-2688, XP000801533.

* cited by examiner

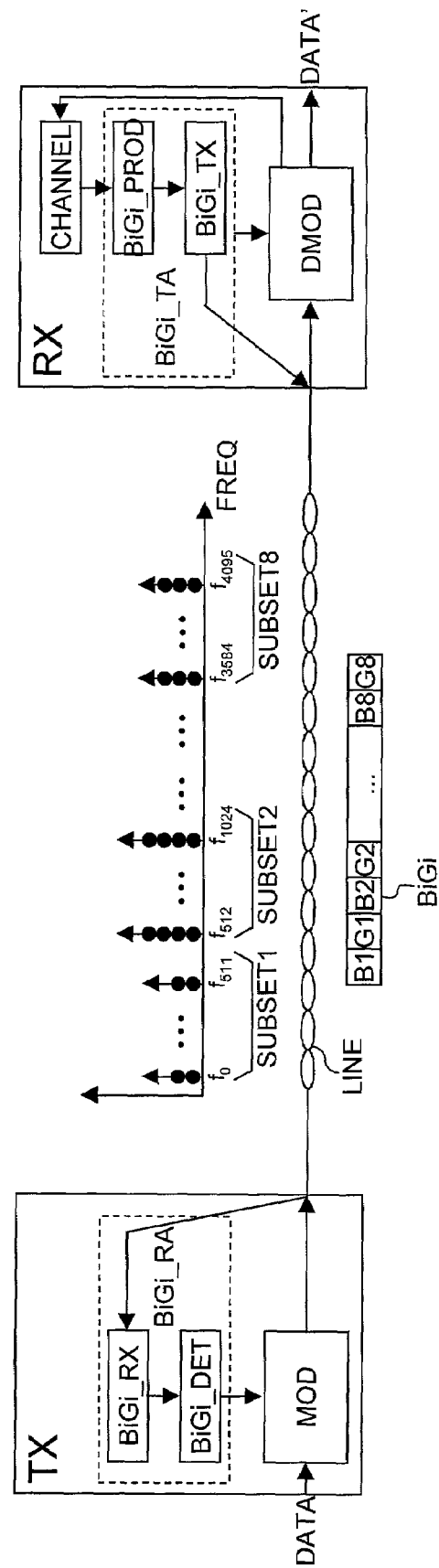

CARRIER CONSTELLATION INFORMATION IN MULTI-CARRIER SYSTEMS

The present invention relates to a constellation information transmitting arrangement for use in a multi-carrier transmitter or multi-carrier receiver of a multi-carrier system, and a constellation information receiving arrangement for use in a multi-carrier transmitter or multi-carrier receiver of a multi-carrier system.

Such arrangements are already known from section 9 *of the ADSL Standard Specification Release* 2 entitled '*Network and Customer Installation Interfaces—Asymmetric Digital Subscriber Line (ADSL) Metallic Interface*', published by the American National Standards Institute (ANSI) under the reference ANSI T1.413-1998. Therein, the ADSL transceiver initialisation procedure is described. According to paragraph 9.8.13, the central office ADSL transceiver produces bits and gains information, i.e. constellation information, for the ADSL upstream carriers and transmits this bits and gains information to the remote ADSL transceiver encapsulated in a message named C-B&G. The bits and gains information consists of a bit number bi which is an unsigned 4-bit integer representing the number of bits to be modulated by the remote ADSL transceiver on the i'th upstream carrier, and a gain value gi which is an unsigned 12-bit fixed point quantity representing the gain to be used for transmission of the i'th upstream carrier. The constellation information produced and transmitted for each upstream carrier thus comprises 16 bits. Upon receipt by the remote ADSL transceiver, the bits and gains information is used to control the upstream data modulator. Similarly, paragraph 9.9.14 of the above referenced ADSL standard specifies that the remote ADSL transceiver has to produce similar bits and gains information for the ADSL downstream carriers and has to transmit this bits and gains information to the central office ADSL transceiver encapsulated in a message named R-B&G. Upon receipt by the central office ADSL transceiver, the bits and gains information is used to control the downstream demodulator. In an ADSL system, 256 carriers or tones are used in a frequency division duplexed way to convey upstream and downstream data. The aggregate constellation information to be transferred during the initialisation procedure consequently is 512 bytes long which delays the initialisation procedure with about 1 second. If the known method to transfer constellation information would be implemented in a multi-carrier system wherein more carriers are used, e.g. a future VDSL (Very High Speed Digital Subscriber Line) system wherein probably up to 4096 carriers may convey data, tens of seconds may be required to transfer the bits and gains information rendering the initialisation procedure unacceptably long.

An object of the present invention is to provide constellation information transmitting and receiving arrangements similar to the known ones, but which avoid that the duration of transferring constellation information becomes unacceptably long in case they are used in a multi-carrier system wherein a high number of carriers is modulated with data.

According to the invention, this object is achieved by the constellation information transmitting arrangement comprising means for producing carrier constellation information indicative for constellations where respective carriers will be modulated with by said multi-carrier transmitter and means for transmitting said carrier constellation information, characterized in that said means for producing carrier constellation information is adapted to produce for at least one respective carrier subset a set of parameter values from which constellations of all carriers in said at least one respective carrier subset can be retrieved through interpolation, and the constellation information receiving arrangement comprising means for receiving carrier constellation information indicative for constellations where respective carriers will be modulated with by said multi-carrier transmitter, and means for determining said constellations from said carrier constellation information, characterized in that said means for determining said constellations comprise interpolating means adapted to retrieve constellations of all carriers in at least one respective carrier subset from a respective set of parameter values that forms part of said carrier constellation information.

Additional characteristic features of a first implementation of the constellation information transmitting arrangement and the constellation information receiving arrangement according to the present invention are that said set of parameter values consists of a first number of bits and a first gain value and that said set of parameter values consists of a first number of bits and a first gain value and in that said interpolating means is adapted to determine for each carrier in said at least one respective carrier subset a number of bits equal to said first number and a gain value equal to said first gain value.

Thus, the set of parameter values for a carrier subset may consist of a bit number and a gain value in a first preferred implementation of the present invention. As a result, carriers belonging to the same subset will be modulated with an equal amount of bits and will be transmitted with the same gain.

Additional characteristic features of a second implementation of the constellation information transmitting arrangement and the constellation information receiving arrangement according to the present invention are that said set of parameter values consists of a first number of bits, a first gain value and a second gain value and that said set of parameter values consists of a first number of bits, a first gain value and a second gain value and in that said interpolating means is adapted to determine for each carrier in said at least one respective carrier subset a number of bits equal to said first number of bits and a gain value through linear interpolation between said first gain value and said second gain value.

Thus, the set of parameter values for a carrier subset may consist of a bit number, a first gain value and a second gain value in a second preferred implementation of the present invention. As a result, carriers belonging to the same subset will be modulated with an equal amount of bits but will be transmitted with a gain obtained through interpolation between the first gain value and the second gain value.

A further characteristic feature of the just mentioned second implementation of the constellation information transmitting arrangement according to the present invention is that said constellations of all carriers in said at least one respective carrier subset can be retrieved through linear interpolation.

In this way, each carrier is transmitted with a gain obtained through linear interpolation between the first gain value and the second gain value, a behavior that corresponds with the linear slope of the channel characteristic or the channel noise.

An additional characteristic feature of the constellation information transmitting arrangement according to the present invention is that said arrangement further contains means to produce a description of said at least one respective carrier subset, and means to transmit said description of said at least one respective carrier subset.

Thus, in case the subsets are not a priori defined, the constellation information message may contain information describing the grouping of carrier subsets.

Yet another characteristic feature of the constellation information transmitting arrangement according to the present invention is that N carriers are divided into M subsets of N/M carriers with successive carrier indices, N being a first integer number representing a total amount of carriers used in said multi-carrier system, and M representing a second integer number whereby N is an integer multiple of M.

In this way, if N is a multiple of M, the M subsets each consist of a block of N/M contiguous carriers.

The above and other objects and features of the invention will become more apparent and the invention itself will be best understood by referring to the following description of an embodiment taken in conjunction with the accompanying drawing FIGURE which is a functional block scheme of a multi-carrier receiver RX comprising an embodiment of the constellation information transmitting arrangement BiGi_TA according to the present invention, and of a multi-carrier transmitter TX comprising an embodiment of the constellation information receiving arrangement BiGi_RA according to the present invention.

BRIEF DESCRIPTION OF THE DRAWINGS

The drawing FIGURE is a functional block scheme of a multi-carrier receiver RX comprising an embodiment of the constellation information receiving arrangement BiGi RA according to the present invention.

DETAILED DESCRIPTION OF THE PREFERRED EMBODIMENT

The drawing FIGURE in fact shows one direction, i.e. either the downstream direction or the upstream direction, of a VDSL system consisting of a multi-carrier VDSL transmitter TX and a multi-carrier VDSL receiver RX interconnected via a telephone line LINE. The VDSL transmitter TX includes a DMT (Discrete Multi Tone) modulator MOD and a constellation information receiving arrangement BiGi_RA. The DMT modulator MOD is coupled between a data input DATA of the VDSL transmitter TX and a terminal of the VDSL transmitter TX coupled to the telephone line LINE. The constellation information receiving arrangement BiGi_RA is coupled between the just mentioned terminal of the VDSL transmitter TX that is coupled to the telephone line LINE and a control input of the DMT modulator MOD and consists of the cascade connection of a constellation information receiver BiGi_RX and a constellation determining circuit BiGi_DET. The VDSL receiver RX includes a DMT demodulator DMOD, a constellation information transmitting arrangement BiGi_TA and channel analysing circuitry CHANNEL. The DMT demodulator DMOD is coupled between a terminal of the VDSL receiver RX coupled to the telephone line LINE and a data output terminal DATA' of the VDSL receiver RX. The constellation information transmitting arrangement BiGi_TA is coupled via the channel analysing circuitry CHANNEL between an output of the DMT demodulator DMOD and the terminal of the VDSL receiver RX coupled to the telephone line LINE. The constellation information transmitting arrangement BiGi_TA consists of the cascade coupling of a constellation information producer BiGi_PROD and a constellation information transmitter BiGi_TX, and also has an output connected to a control input of the DMT demodulator DMOD.

The drawing FIGURE further shows the carriers $f_0 \ldots f_{511}$, $f_{512} \ldots f_{1023}, \ldots, f_{3584} \ldots f_{4095}$ that are used for transmission from the VDSL transmitter TX to the VDSL receiver RX and a constellation information message BiGi transmitted from the constellation information transmitter BiGi_TX to the constellation information receiver BiGi_RX.

In the VDSL system of the drawing FIGURE the 4096 carriers $f_0 \ldots f_{511}, f_{512} \ldots f_{1023}, \ldots f_{3584} \ldots f_{4095}$ are a priori grouped in 8 carrier subsets SUBSET1, SUBSET2, . . . , SUBSET8 each consisting of 512 contiguous carriers. The channel analysing circuitry CHANNEL upon transmission of a predetermined sequence measures the signal-to-noise ratio (SNR) for each carrier $f_0 \ldots f_{511}, f_{512} \ldots f_{1023}, \ldots f_{3584} \ldots f_{4095}$. These signal-to-noise ratio values are used by the constellation information producer BiGi_PROD to determine for each carrier subset SUBSET1, SUBSET2, . . . , SUBSET8 the number of bits that can be modulated on each carrier of this subset and the gain where each carrier of this subset should be transmitted with. The so obtained 8 bit values B1, B2, . . . , B8 and 8 gain values G1, G2, . . . , G8 are encapsulated in the constellation information message BiGi by the constellation information transmitter BiGi_TX. The constellation information message BiGi is transmitted over the telephone line LINE from the constellation information transmitter BiGi_TX to the constellation information receiver BiGi_RX and for example has a length of 128 bits if a 4-bit integer value is used for the bit numbers and a 12-bit fixed point quantity is used for the gain values. The constellation information receiver BiGi_RX decapsulates the constellation information message and supplies the parameter values B1, G1, B2, G2, . . . , B8, G8 to the constellation determining circuitry BiGi_DET. For the operation of the constellation determining circuitry, a constant bit interpolation function and a constant gain interpolation function are a priori defined. For each subset, SUBSET1, SUBSET2, . . . , SUBSET8, the constellation determining circuitry BiGi_DET thus constantly interpolates the received bit number, B1, B2, . . . , B8 respectively, to obtain for each carrier the number of bits that should be modulated thereon. Similarly, the constellation determining circuitry BiGi_DET constantly interpolates for each subset, SUBSET1, SUBSET2, . . . , SUBSET8, the received gain value, G1, G2, . . . , G8 respectively, to obtain for each carrier the gain with which the carrier should be transmitted. The so generated bits and gains information is supplied to the control input of the DMT modulator MOD which as a consequence thereof modulates B1 bits (B1 is supposed to be 2 in FIGURE) on the carriers $f_0 \ldots f_{511}$ of SUBSET1 and transmits these carriers with gain G1, modulates B2 bits (B2 is supposed to be 4 in FIGURE) on the carriers $f_{512} \ldots f_{1023}$ of SUBSET2 and transmits these carriers with gain G2, . . . , modulates B8 bits (B8 is supposed to be 3 in FIGURE) on the carriers $f_{3584} \ldots f_{4095}$ of SUBSET8 and transmits these carriers with gain G8. In the VDSL receiver RX, the DMT demodulator DMOD demodulates the correct amount of bits from the carriers $f_0 \ldots f_{511}, f_{512} \ldots f_{1023}, \ldots, f_{3584} \ldots f_{4095}$ since the demodulator DMOD is made aware of the bits and gains information directly by the constellation information transmitting arrangement BiGi_TA. This information is supplied to the control terminal of the DMT demodulator DMOD.

In a second embodiment of the present invention, not illustrated by any drawings, 4096 carriers may again a priori be grouped into 8 carrier subsets of 512 carriers. From channel information, the constellation information producer derives for each of the 8 carrier subsets a bit number, a gain value at which the carrier with the lowest index in the subset should be transmitted and a gain value at which the carrier with the highest index in the subset should be transmitted. For operation of the constellation determining circuitry, a constant bit interpolation function and linear gain interpolation function are a priori specified. In each subset, all carriers will again carry the same number of bits, but the gain of a carrier will be given by a linear interpolation between the two limits of the subset where the carrier forms part of.

In yet another embodiment of the present invention, not illustrated by any of the drawings, the carriers are not a priori grouped in subsets. After channel analysis, the carriers are grouped in subsets of carriers where the same amount of bits will be allocated to and where the applied gain is obtained for through linear interpolation. The overall gain consequently will have a saw tooth behaviour. The subsets of carriers typically will not contain the same number of carriers and the constitution of the subsets will be reported via messages (possibly via the constellation information message BiGi) from the VDSL receiver to the VDSL transmitter.

Evidently, what is described above for one direction, e.g. the downstream direction, of a VDSL system, may also be implemented in the inverse direction, the upstream direction. The constellation information message that indicates bit and gain assignment to the upstream carriers is thus also kept short according to the principles of the present invention.

It is remarked that transmitting and computing bits and gains information according to the present invention may be applied at initialisation and as already argued above will not hinder fast initialisation then, but alternatively may be applied during operation to adapt the carrier constellations according to changes of the channel characteristics.

Although reference was made above to VDSL (Very High Speed Digital Subscriber Line) technology, any skilled person will appreciate that the present invention also can be applied in ADSL (Asynchronous Digital Subscriber Line), SDSL (Synchronous Digital Subscriber Line), HDSL (High Speed Digital Subscriber Line) systems and the like, provided that a multi-carrier linecode with constellations of variable size is used therein.

The person skilled in the art of communications will also appreciate that the SNR measurement upon transfer of a predetermined sequence to estimate the channel characteristics was only given as an example and not as a limitative aspect of the present invention, since many alternative ways to determine the channel quality are known from literature.

Furthermore, it is noticed that different functional blocks of the drawing FIGURE may be implemented in hardware as well as in software. Whereas the constellation information transmitter BiGi_TX and receiver BiGi_RX for example may be interfaces realised in hardware, the constellation information producer BiGi_PROD and the constellation determining circuitry BiGi_DET can be arithmetic algorithms implemented in software.

It is to be remarked that the present invention does not require any particular multi-carrier line code modulation technique to be used, so that e.g. Discrete Multi Tone (DMT) modulation, Zipper modulation, OFDM (Orthogonal Frequency Division Modulation), or even alternative multi-carrier modulation schemes may be applied, provided that the constellation is of variable size.

It is also noticed that, although the digital data in the above described communication system are transported over a twisted pair telephone line LINE, the applicability of the present invention is not restricted by the transmission medium via which the data are transported. In particular on a cable connection, an optical connection, a satellite connection, a radio link through the air, and so on, the present invention may be realized.

Furthermore, it is remarked that an embodiment of the present invention is described above rather in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

The invention claimed is:

1. A constellation information transmitting arrangement for a multi-carrier transmitter or a multi-carrier receiver of a multi-carrier system, said arrangement comprising:
   means for producing carrier constellation information indicative for constellations where respective carriers will be modulated with by said multi-carrier transmitter; and
   means for transmitting said carrier constellation information,
   wherein said means for producing said carrier constellation information is adapted to group carriers in subsets and to produce for at least one respective subset a limited set of parameter values from which constellations of each carrier in said at least one respective subset can be derived through interpolation.

2. The constellation information transmitting arrangement according to claim 1,
   wherein said limited set of parameter values comprises a first number of bits and a first gain value.

3. The constellation information transmitting arrangement according to claim 1,
   wherein said limited set of parameter values comprises a first number of bits, a first gain value and a second gain value.

4. The constellation information transmitting arrangement according to claim 3,
   wherein said constellations of each carrier in said at least one respective subset can be derived through linear interpolation.

5. The constellation information transmitting arrangement according to claim 4, further comprising:
   means to produce a description of said at least one respective subset; and
   means to transmit said description of said at least one respective subset.

6. The constellation information transmitting arrangement according to claim 4,
   wherein N carriers are divided into M subsets of N/M carriers with successive carrier indices, N being a first integer number representing a total amount of carriers used in said multi-carrier system, and M representing a second integer number whereby N is an integer multiple of M.

7. The constellation information transmitting arrangement according to claim 1, further comprising:
   means to produce a description of said at least one respective subset; and
   means to transmit said description of said at least one respective subset.

8. The constellation information transmitting arrangement according to claim 1,
wherein N carriers are divided into M subsets of N/M carriers with successive carrier indices, N being a first integer number representing a total amount of carriers used in said multi-carrier system, and M representing a second integer number whereby N is an integer multiple of M.

9. A constellation information receiving arrangement for a multi-carrier transmitter or a multi-carrier receiver of a multi-carrier system, said arrangement comprising:
means for receiving carrier constellation information indicative for constellations where respective carriers will be modulated with by said multi-carrier transmitter; and
means for determining said constellations from said carrier constellation information,
wherein carriers are grouped in subsets in said carrier constellation information, and
wherein said means for determining said constellations comprises interpolating means adapted to derive constellations of each carrier in at least one respective subset from a respective limited set of parameter values that forms part of said carrier constellation information.

10. The constellation information receiving arrangement according to claim 9,
wherein said limited set of parameter values comprises a first number of bits and a first gain value, and
wherein said interpolating means is adapted to determine for each carrier in said at least one respective subset a number of bits equal to said first number and a gain value equal to said first gain value.

11. The constellation information receiving arrangement according to claim 10, further comprising:
means to receive a description of said at least one respective subset; and
means to interpret said description of said at least one respective subset.

12. The constellation information receiving arrangement according to claim 9,
wherein said limited set of parameter values comprises a first number of bits, a first gain value and a second gain value, and
wherein said interpolating means is adapted to determine for each carrier in said at least one respective subset a number of bits equal to said first number of bits and a gain value through linear interpolation between said first gain value and said second gain value.

13. The constellation information receiving arrangement according to claim 12, further comprising:
means to receive a description of said at least one respective subset; and
means to interpret said description of said at least one respective subset.

14. The constellation information receiving arrangement according to claim 9, further comprising:
means to receive a description of said at least one respective subset; and
means to interpret said description of said at least one respective subset.

* * * * *